United States Patent [19]

Kornylo

[11] Patent Number: 4,551,891
[45] Date of Patent: Nov. 12, 1985

[54] COMPOSITE TRIM FOUNDATION PANEL AND CLIP

[75] Inventor: Walter P. Kornylo, Livonia, Mich.
[73] Assignee: General Motors Corporation, Detroit, Mich.
[21] Appl. No.: 578,123
[22] Filed: Feb. 8, 1984
[51] Int. Cl.⁴ .............................................. A44B 21/00
[52] U.S. Cl. ...................................... 24/669; 428/99; 428/100
[58] Field of Search ...................... 428/99, 100; 24/669

[56] References Cited
U.S. PATENT DOCUMENTS
4,424,612 1/1984 Muller et al. ......................... 24/669

Primary Examiner—Alexander S. Thomas
Attorney, Agent, or Firm—Herbert Furman

[57] ABSTRACT

A composite trim foundation panel of densified wood fibers and resin and a molded-in clip wherein the clip includes a base portion provided with outwardly flared segmented fingers which project from the inner surface thereof into the panel with the fingers and the base portion being both adhesively and mechanically bonded to the panel during densification of the panel in a mold. The clip also includes a return bent portion spaced from the base and provided with a slot for receiving the head of a fastener to mount the panel and clip to a vehicle body.

1 Claim, 4 Drawing Figures

COMPOSITE TRIM FOUNDATION PANEL AND CLIP

This invention relates generally to a composite trim foundation panel and clip and more particularly to a composite of a trim foundation panel of densified wood fibers and resin and a molded-in clip.

It is known to form trim foundation panels of a densified batten of wood fibers and a resin binder. Generally the batten has a thickness of approximately one inch and under temperature and pressure in a mold, the batten is pressed into an approximately ⅛" thick panel. This panel is trimmed to the desired shape of the foundation panel after removal from the mold. Thereafter, the outer side of the panel is covered with trim material.

In order to mount the panel to a vehicle body, such as to the inner panel of a vehicle door, it is known to attach retainer clips to the panel. The retainer clips are attached in a staking operation after formation of the panel. These clips are located on the inner side of the panel and receive headed fasteners which are received in suitable openings in the vehicle body.

This invention provides a composite of the foundation panel and the clip. In the preferred embodiment of the invention, the clip includes a base having rows of openings along opposite end edge portions thereof by punching out the metal of the base into tulip like outwardly flared segmented fingers which project from the inner surface of the base. A return bent portion of the clip overlies the base between the rows of openings and is integrally joined to one side edge of the base. The return bent portion is provided with an open slot to receive the head of a fastener between the return bent portion and the base. The free edge of the return bent portion to which the slot opens is provided with tabs which underlie the base.

In order to form the composite trim foundation panel and clip, a series of mold inserts are provided in the base of the mold. The mold inserts have stepped recesses which receive the return bent portions and the base of the clips. When the clips are placed in the mold inserts, segmented fingers project outwardly of the insert. The batten is placed over the clips. During densification of the batten under heat and pressure, the wood fibers and the resin binder are forced against the tabs of the return bent portion and the bases of the clips to force the tabs against the base and provide an adhesive bond between the densified batten, the base and the tabs. The wood fibers and resin binder are also forced into the clip openings and between the fingers and the base to provide both an adhesive and a mechanical bond. The fingers project only partially through the resulting trim foundation panel. The resultant composite, when removed from the mold, need only be trimmed and then covered with trim. Tests have shown that the bond between the clips and the trim panel has a pull-out strength exceeding that of a staked clip by a factor of 3:1.

The primary feature of this invention is that it provides a composite trim foundation panel of densified wood fibers and resin binder and a molded-in clip. Another feature is that the clip has a base which is adhesively secured to one side of the foundation panel and a series of flared tulip like anchors which are mechanically and adhesively secured to the foundation panel during densification thereof by heat and pressure in a mold. A further feature is that a return bent portion overlies the base and includes an open slot for receiving the head of a fastener between the return bent portion and the base to provide for securement of the foundation panel and assembled trim to the vehicle body panel. Yet another feature is that the anchors comprise outwardly flared fingers which are formed from the material of punched out rows of openings along the edge portions of the base, with these openings being filled by densified wood fibers and binder.

These and other features will be readily apparent from the following specification and drawing wherein.

Figure 1:
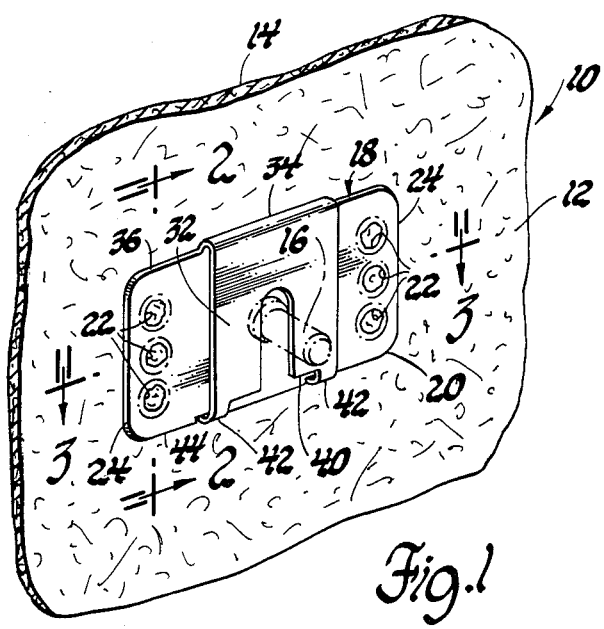
FIG. 1 is a perspective view of a portion of a composite trim foundation panel and molded-in clip.

Referring now to the drawing, a trim foundation panel designated generally 10 is formed of a densified batten of wood fibers and resin binder. Foundation panels such as this are in current production use in the automobile industry. Generally these foundation panels are formed in a mold by densifying an approximate 1" batten of wood fibers and resin particles to an approximate ⅛" thick panel under heat and pressure conditions. The panels, once removed from the mold, are trimmed in various conventional manners to the desired shape. As shown in FIG. 1, panel 10 includes an inner surface or side 12 and an outer surface or side 14. The outer surface 14 is conventionally covered with soft trim, such as vinyl or cloth, not shown, which may be backed with one or more resilient under layers and embossed or otherwise formed for decorative purposes. The surface 12 faces the vehicle body panel, such as the door inner panel, to which the trim foundation panel is mounted by a series of conventional headed fasteners 16 schematically indicated in FIG. 1.

Figure 2:
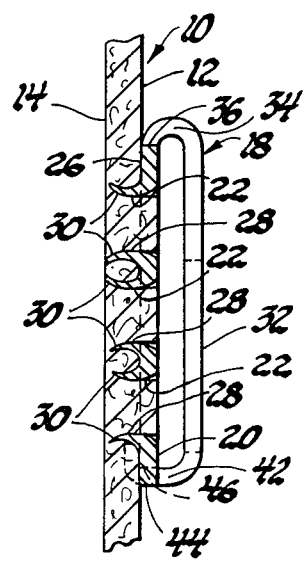
FIG. 2 is an enlarged sectional view taken along line 2—2 of FIG. 1.
Figure 3:
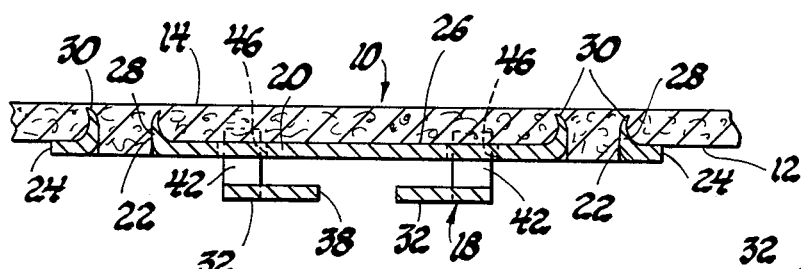
FIG. 3 is an enlarged sectional view taken along line 3—3 of FIG. 1.
Figure 4:
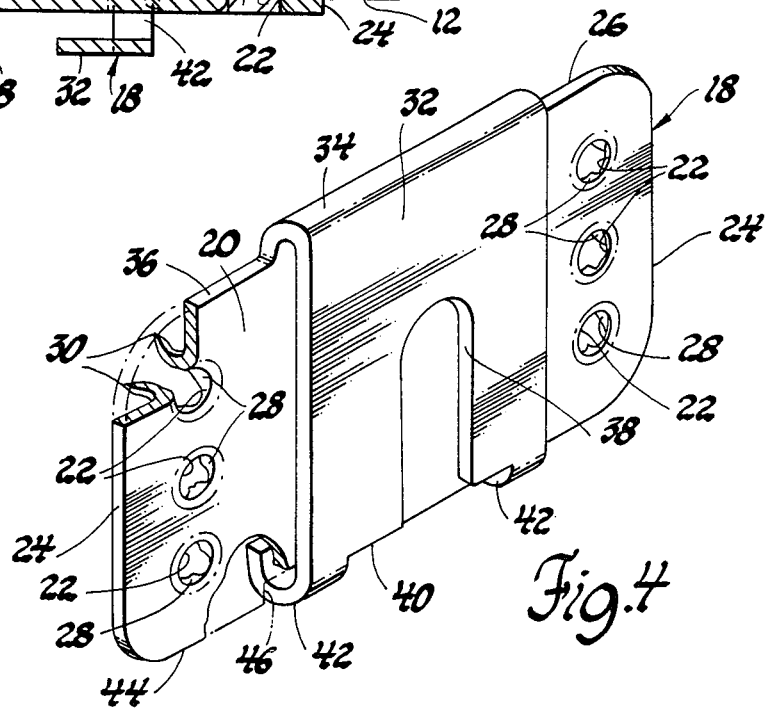
FIG. 4 is a partially broken away enlarged perspective view of the molded-in clip.

A series of clips 18 are secured to the panel 10 as will be described. Each clip 18 includes a generally rectangular base 20 having rows of punched out openings 22 adjacent transverse or end edges 24 thereof. As can be seen from FIGS. 2 and 3, the metal from each of the openings 22 is displaced outwardly from the inner surface 26 of the base into tulip like anchors 28 which are comprised of a series of segmented flared fingers 30. A return bent portion 32 of the clip is connected by an integral arcuate juncture 34 to one longitudinal or side edge 36 of the base 20. This locates the return bent portion in overlying relationship to the outer surface of the base. The return bent portion includes a slot 38 therein which opens to the free edge 40 of the return bent portion 32. This edge includes a pair of integral reversely bent tabs 42 which loosely receive the longitudinal edge 44 of the base 20 opposite the edge 36. The bights of tabs 42 fit within notches 46 in edge 44.

The mold in which the foundation panel is formed is provided with a series of mold inserts at each of the locations of a clip 18. These mold inserts, although not shown herein, are recessed in the lower wall of the mold. Each insert includes a first recess for receiving the return bent portion 32 of a clip and a second stepped recess for receiving a base 20 of a clip so that the inner surfaces 26 of the clips are flush with the surface of the wall of the mold. Once the clips are loaded into the mold inserts, an approximately 1" thick batten of wood fibers and resin binder is placed in the mold over the clips and the batten is thereafter densified under heat and pressure into a trim foundation panel 10 which is approximately ⅛" thick. During densification, the wood fibers and resin binder are forced against the inner surfaces 26 of the clips 28 and adhesively secured thereto. The densified wood fibers and resin binder are also forced between the fingers 30 and the surface 26 of the base 20 as well as into each of the apertures 22 to thereby additionally provide an adhesive and mechanical bond between the clip 18 and the panel 10.

The resultant composite trim foundation panel and clip requires no further operations when removed from the mold other than trimming to the desired shape. Additionally, the bond between the clips 18 and foundation panel 10, is much greater than that of conventional staked clips by a factor of approximately 3:1.

Thus this invention provides an improved composite trim foundation panel and molded-in clip.

The embodiments of the invention in which an exclusive property or privilege is claimed are defined as follows:

1. A one piece clip for securement to a trim foundation panel during formation of the panel from a densified batten of wood fibers and resin binder, the clip including a planar base of generally rectangular shape having an inner surface against which the batten of wood fibers and resin binder is densified to adhesively bond the outer surface of the panel to the inner surface of the clip base, the clip further including an outer surface and a plurality of spaced openings adjacent the transverse edges thereof, the material of the openings being formed into a series of anchors extending inwardly of the inner surface of the clip base, the anchors being anchored in the foundation panel as the batten of wood fibers and resin binder is densified against the inner surface of the clip base and the wood fibers and the resin binder are forced within the anchors and between the anchors and the inner surface of the clip base, the clip further including a retention portion located in spaced overlying relationship to the outer surface of the clip base and having one edge portion thereof integrally secured to one longitudinal edge portion of the clip base, the retention portion including a free edge portion adjacent the other longitudinal edge portion of the clip base and provided with generally U-shaped return bent tabs loosely receiving such other longitudinal edge portion of the clip base, the return bent tabs being forced against the inner surface of the clip base during the densification of the batten, the retention portion further including a slot opening to the free edge portion thereof for receiving the shank of a headed stud to trap the head of the stud between the retention portion and the outer surface of the clip base.

* * * * *